United States Patent
Yamada

(10) Patent No.: US 12,471,009 B2
(45) Date of Patent: Nov. 11, 2025

(54) COMMUNICATION APPARATUS CAPABLE OF RECEIVING PREDETERMINED INFORMATION FOR CONNECTING TO AN EXTERNAL ACCESS POINT FROM AN INFORMATION PROCESSING APPARATUS HAVING READ A PREDETERMINED TWO-DIMENSIONAL CODE, CONTROL METHOD, AND STORAGE MEDIUM THEREFOR

(71) Applicant: CANON KABUSHIKI KAISHA, Tokyo (JP)

(72) Inventor: Kohei Yamada, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 226 days.

(21) Appl. No.: 17/820,977

(22) Filed: Aug. 19, 2022

(65) Prior Publication Data

US 2023/0060244 A1   Mar. 2, 2023

(30) Foreign Application Priority Data

Aug. 30, 2021   (JP) ................. 2021-140198

(51) Int. Cl.
*H04W 48/16*   (2009.01)
*H04N 1/32*   (2006.01)
*H04W 76/14*   (2018.01)

(52) U.S. Cl.
CPC ........ *H04W 48/16* (2013.01); *H04N 1/32117* (2013.01); *H04N 1/32272* (2013.01); *H04W 76/14* (2018.02)

(58) Field of Classification Search
CPC ..... H04W 48/16; H04W 76/14; H04W 8/005; H04W 88/04; H04N 1/32117; H04N 1/32272
See application file for complete search history.

(56) References Cited

U.S. PATENT DOCUMENTS

| | | | |
|---|---|---|---|
| 2019/0215878 A1* | 7/2019 | Goto | G06K 19/06037 |
| 2019/0306710 A1* | 10/2019 | Cammarota | H04W 12/06 |
| 2024/0049266 A1* | 2/2024 | Lee | H04W 12/50 |

FOREIGN PATENT DOCUMENTS

| | | |
|---|---|---|
| JP | 2016127545 A | 7/2016 |
| JP | 2018195886 A | 12/2018 |

(Continued)

*Primary Examiner* — Walli Z Butt
(74) *Attorney, Agent, or Firm* — Canon U.S.A., Inc. IP Division

(57) ABSTRACT

A communication apparatus capable of communicating with an information processing apparatus includes a reception unit that receives a predetermined instruction, an output unit that outputs a predetermined two-dimensional code based on the received predetermined instruction, a control unit that, based on the received predetermined instruction, causes the communication apparatus to start an operation in a predetermined mode for receiving predetermined information for connecting to an external access point that is external to the information processing apparatus and the communication apparatus from the information processing apparatus having read the predetermined two-dimensional code, and a connection unit that, in a case that the predetermined information is received from the information processing apparatus having read the predetermined two-dimensional code, connects the external access point and the communication apparatus to each other based on the predetermined information.

17 Claims, 8 Drawing Sheets

(56) References Cited

FOREIGN PATENT DOCUMENTS

| JP | 2019180036 A | 10/2019 |
| JP | 2019180039 A | 10/2019 |

\* cited by examiner

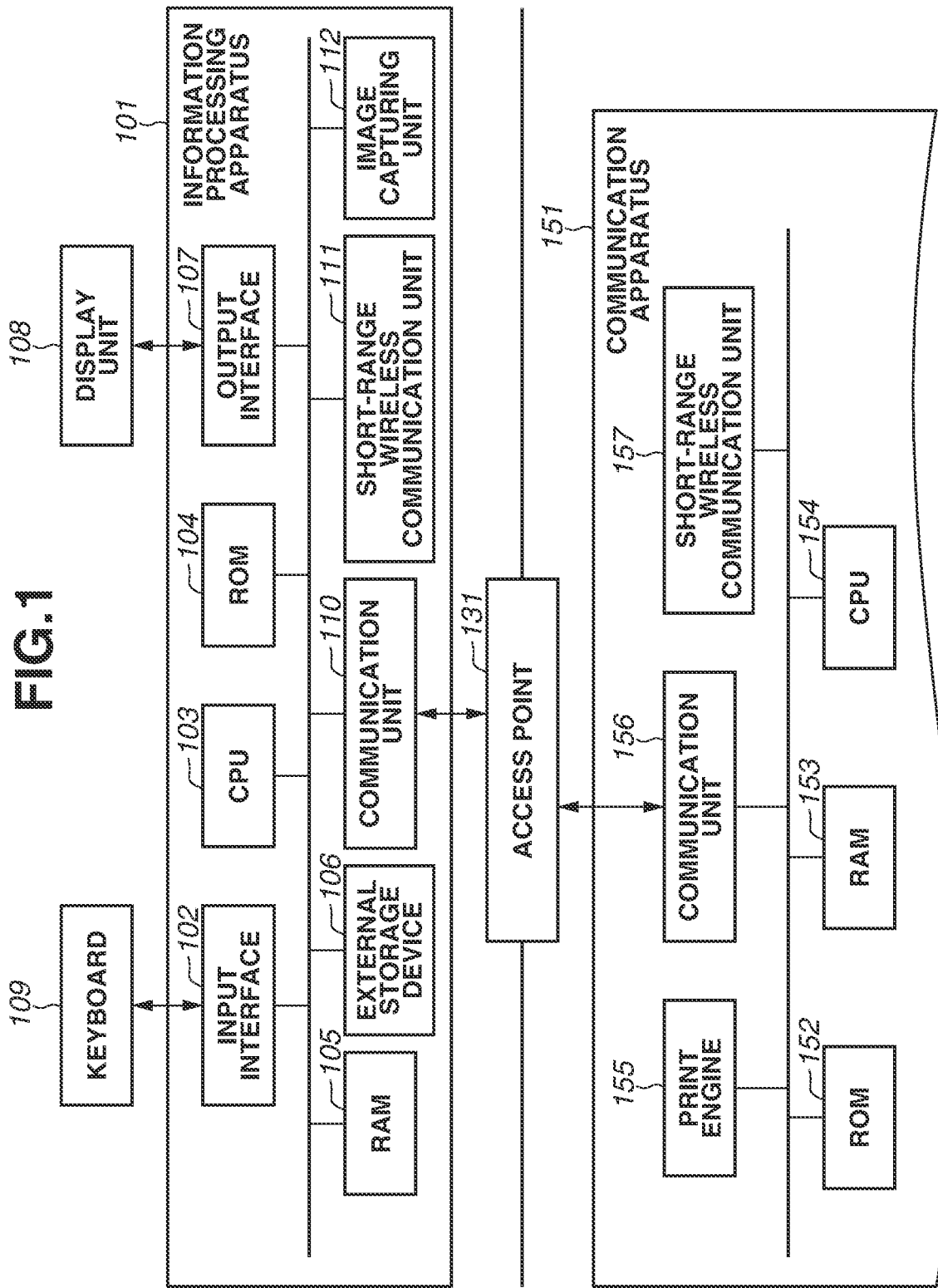

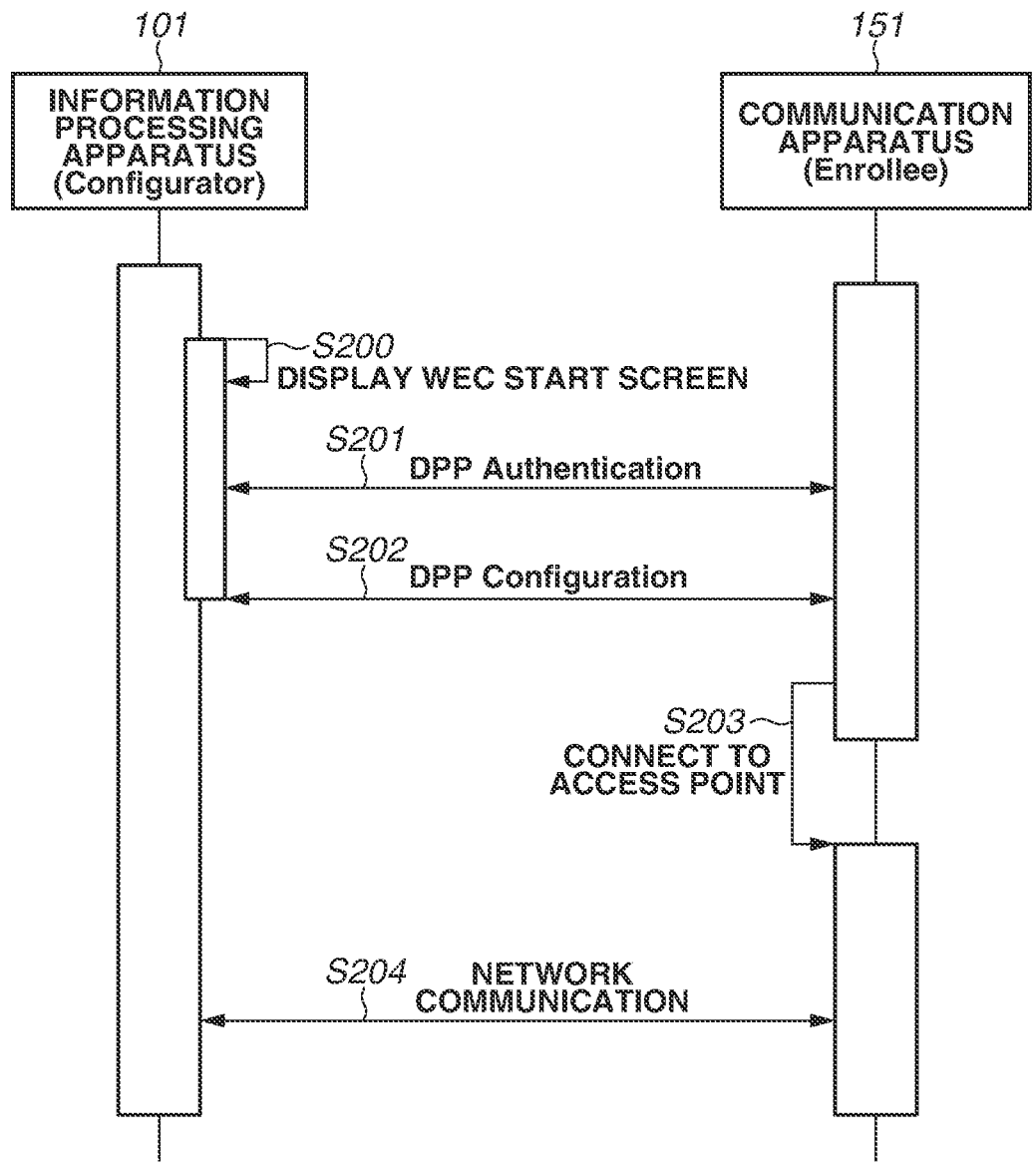

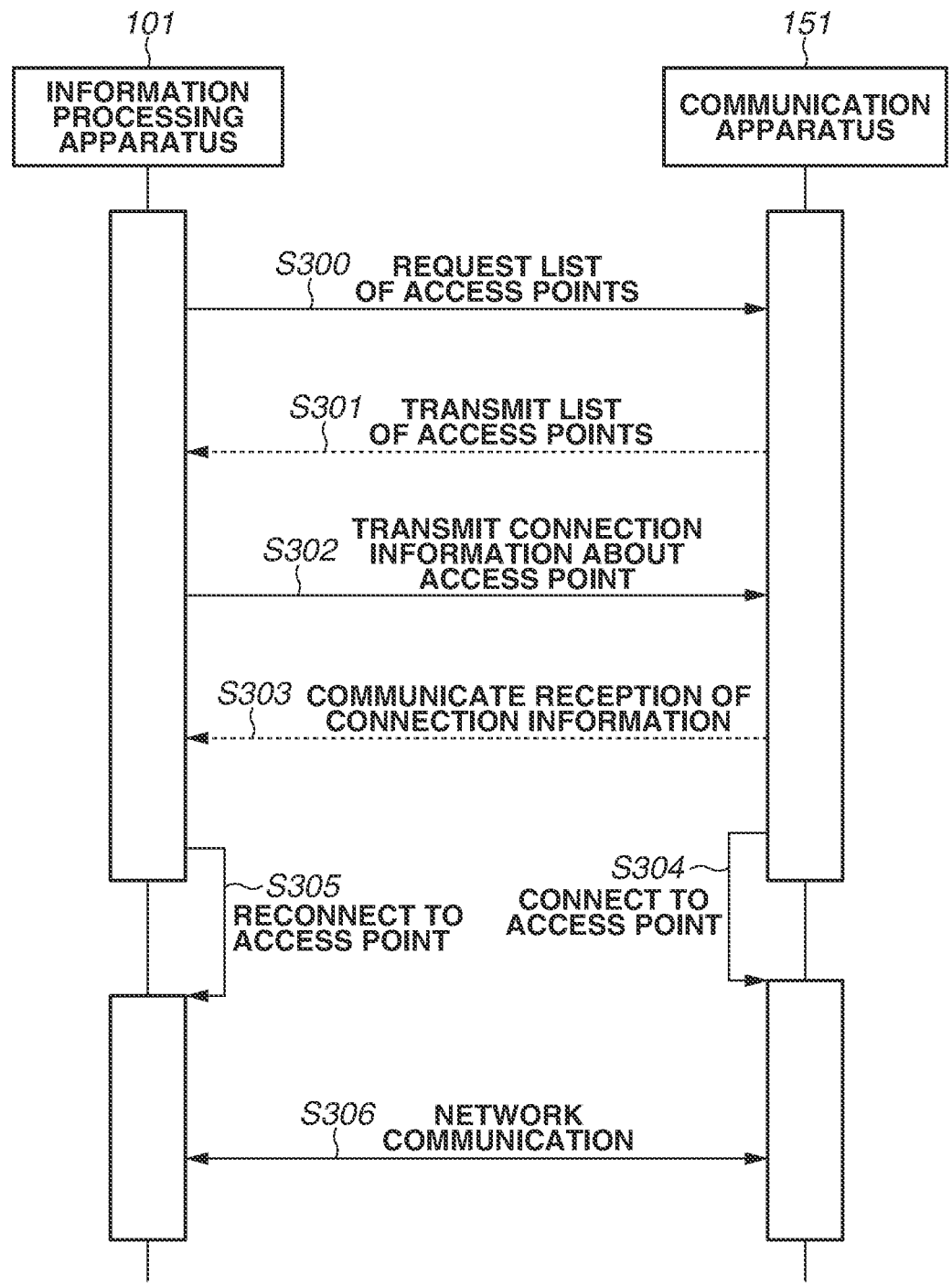

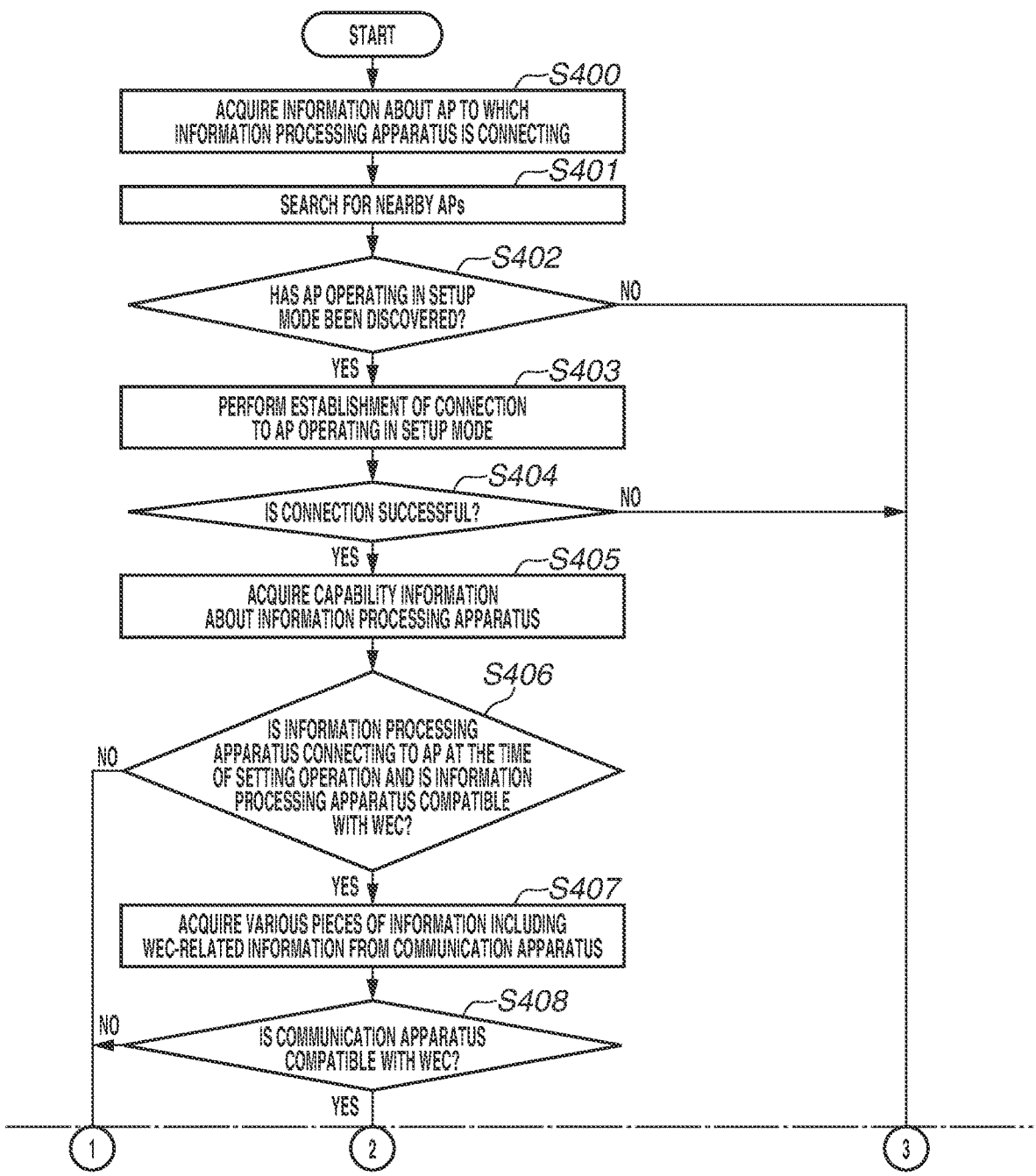

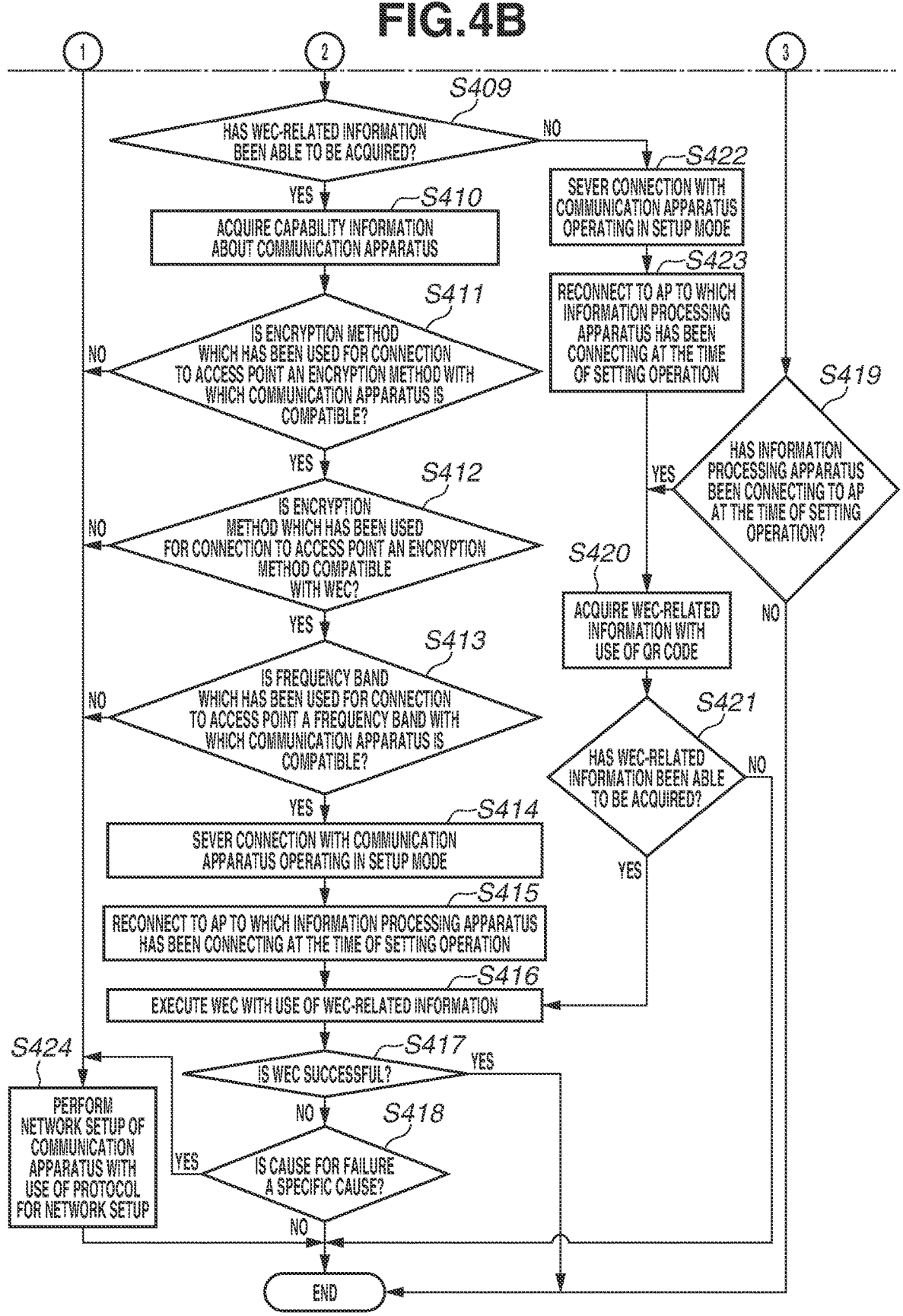

COMMUNICATION APPARATUS CAPABLE OF RECEIVING PREDETERMINED INFORMATION FOR CONNECTING TO AN EXTERNAL ACCESS POINT FROM AN INFORMATION PROCESSING APPARATUS HAVING READ A PREDETERMINED TWO-DIMENSIONAL CODE, CONTROL METHOD, AND STORAGE MEDIUM THEREFOR

BACKGROUND

Field

Aspects of the present disclosure generally relate to an information processing apparatus, a control method therefor, and a storage medium.

Description of the Related Art

Japanese Patent Application Laid-Open No. 2016-127545 discusses a technique in which an information processing apparatus such as a personal computer (PC) transmits information about an access point to a communication apparatus such as a printer, thus causing the communication apparatus and the access point to connect to each other.

Furthermore, with the popularization of the function of transmitting, to a communication apparatus, connection information for use in connecting to an access point, thus causing the communication apparatus and the access point to connect to each other, it is being requested to increase the convenience of such a function.

SUMMARY

Aspects of the present disclosure are generally directed to increasing the convenience of a function of causing a communication apparatus and an access point to connect to each other.

According to an aspect of the present disclosure, a communication apparatus capable of communicating with an information processing apparatus includes a reception unit configured to receive a predetermined instruction, an output unit configured to output a predetermined two-dimensional code based on the received predetermined instruction, a control unit configured to, based on the received predetermined instruction, cause the communication apparatus to start an operation in a predetermined mode for receiving predetermined information for connecting to an external access point that is external to the information processing apparatus and the communication apparatus from the information processing apparatus having read the predetermined two-dimensional code, and a connection unit configured to, in a case that the predetermined information is received from the information processing apparatus having read the predetermined two-dimensional code, connect the external access point and the communication apparatus to each other based on the predetermined information.

Further features of the present disclosure will become apparent from the following description of exemplary embodiments with reference to the attached drawings.

BRIEF DESCRIPTION OF THE DRAWINGS

FIG. 1 is a diagram illustrating configurations of an information processing apparatus and a communication apparatus.

FIG. 2 is a sequence diagram illustrating network setup processing using Device Provisioning Protocol (DPP), which is performed by the information processing apparatus and the communication apparatus.

FIG. 3 is a sequence diagram illustrating network setup processing using Simple Network Management Protocol (SNMP), which is performed by the information processing apparatus and the communication apparatus.

FIGS. 4A and 4B are flowcharts illustrating the flow of processing which the information processing apparatus performs in the network setup processing.

DESCRIPTION OF THE EMBODIMENTS

Figure 5:
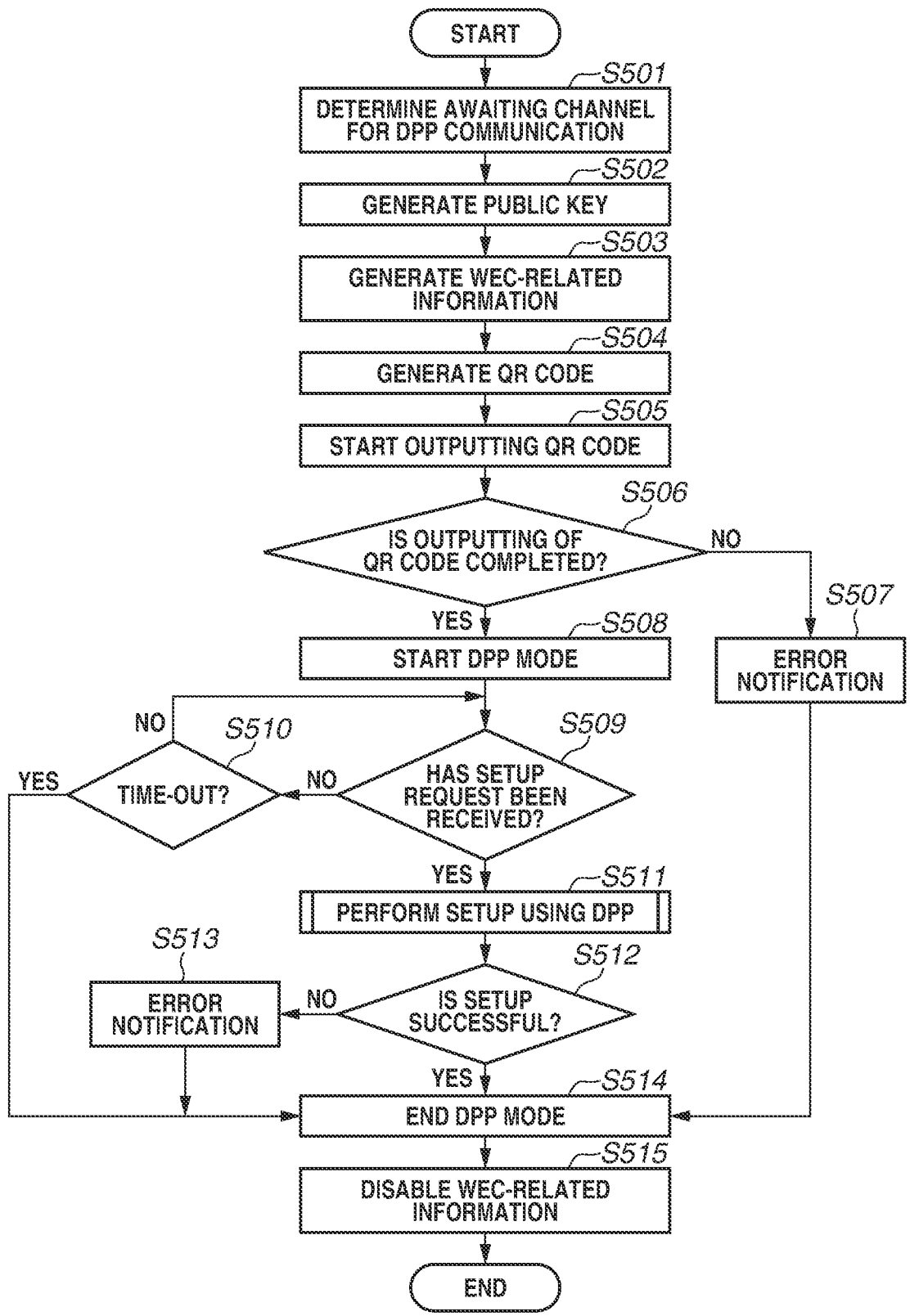
FIG. 5 is a flowchart illustrating the flow of processing which the communication apparatus performs.

Various exemplary embodiments, features, and aspects of the disclosure will be described in detail below with reference to the drawings. However, with regard to the present disclosure, it should be understood that configurations obtained by making modifications or improvements to exemplary embodiments described below as appropriate based on the ordinary knowledge of a person skilled in the art within a range not departing from the spirit of the present disclosure also fall within the scope of the present disclosure.

An information processing apparatus and a communication apparatus which are included in a communication system according to an exemplary embodiment of the present disclosure are described. While, in the present exemplary embodiment, a smartphone is described as an example of the information processing apparatus, the present exemplary embodiment is not limited to this. For example, various apparatuses, such as a mobile terminal, a personal computer (PC), a tablet terminal, a personal digital assistant (PDA), and a digital camera, can be applied as the information processing apparatus. Moreover, while, in the present exemplary embodiment, a printer is described as an example of the communication apparatus, the present exemplary embodiment is not limited to this, and various apparatuses can be applied as the communication apparatus, as long as those are capable of communicating with the information processing apparatus. For example, the applicable printer includes, for example, an inkjet printer, a full-color laser beam printer, and a monochrome printer. Moreover, not only a printer but also a copying machine, a facsimile apparatus, a portable terminal, a smartphone, a notebook PC, a tablet terminal, a PDA, a digital camera, a music playback device, a television set, or a smart speaker can be applied as the communication apparatus. Besides, a multifunction peripheral equipped with a plurality of functions including, for example, a copying function, a facsimile function, and a printing function can also be applied as the communication apparatus.

Moreover, in the present exemplary embodiment, in a case where the information processing apparatus is compatible with a function called Wi-Fi Easy Connect™ (Wi-Fi CERTIFIED Easy Connect®) (WEC), the information processing apparatus is able to execute such a function. WEC is a function which performs network setup of another apparatus with use of Device Provisioning Protocol (DPP) formulated by the Wi-Fi® Alliance. Furthermore, network setup of another apparatus is, specifically, processing for causing another apparatus to connect to an access point, which forms a network. In WEC, communications are performed between a device which operates in the role of "configurator" (hereinafter referred to as a "configurator device") and a device which operates in the role of "enrollee" (hereinafter referred to as an "enrollee device"). The configurator device acquires bootstrapping information from the enrollee device. The bootstrapping information includes, for example, identification information (e.g., media access control (MAC) address) about the enrollee device, public key information which is used to perform secure communications with the enrollee device, and information indicating a channel (awaiting channel) for use in communication of the DPP. In the present exemplary embodiment, the bootstrapping information is described as "WEC-related information". Furthermore, another pieces of information can also be treated as WEC-related information. Then, the configurator device performs wireless communication with the enrollee device with use of the acquired bootstrapping information. Specifically, for example, the configurator device encrypts a protocol key with use of a public key included in the bootstrapping information, and transmits the encrypted protocol key to the enrollee device. Then, the configurator device encrypts a common key based on the encrypted protocol key, and transmits information encrypted with use of the common key to the enrollee device. Furthermore, information to be transmitted here is, specifically, for example, a network setup request using the DPP or connection information used for connecting to an access point. Then, the enrollee device establishes wireless connection with an access point using the connection information received from the configurator device. Furthermore, in network setup processing using WEC in the present exemplary embodiment, an information processing apparatus compatible with WEC is assumed to operate as a configurator device and a communication apparatus compatible with WEC is assumed to operate as an enrollee device.

First, configurations of an information processing apparatus in the present exemplary embodiment and a communication apparatus capable of communicating with the information processing apparatus in the present exemplary embodiment are described with reference to the block diagram of FIG. 1. Moreover, while, in the present exemplary embodiment, the following configurations are described as an example, the present exemplary embodiment is directed to functions applicable with respect to an apparatus capable of communicating with the communication apparatus and should not be construed to limit functions thereof to those illustrated in FIG. 1.

An information processing apparatus 101 serves as the information processing apparatus in the present exemplary embodiment. The information processing apparatus 101 includes, for example, an input interface 102, a central processing unit (CPU) 103, a read-only memory (ROM) 104, a random access memory (RAM) 105, an external storage device 106, an output interface 107, a display unit 108, a communication unit 110, a short-range wireless communication unit 111, and an image capturing unit 112. For example, the CPU 103, the ROM 104, and the RAM 105 are configured to form a computer of the information processing apparatus 101.

The input interface 102 is an interface for receiving a data input or an operation instruction from the user issued by an operation unit such as a keyboard 109 being operated. Furthermore, the operation unit can be, for example, a physical keyboard or physical buttons, or can be, for example, a software keyboard or software buttons which are displayed on the display unit 108. Thus, the input interface 102 can be configured to receive an input from the user via the display unit 108.

The CPU 103 is a system control unit, and controls the entire information processing apparatus 101.

The ROM 104 stores fixed data such as control programs, data tables, and a built-in operating system (OS) program, which the CPU 103 executes. In the present exemplary embodiment, the control programs stored in the ROM 104 are used to perform software execution control, such as scheduling, task switching, and interrupt processing, under the control of the built-in OS stored in the ROM 104.

The RAM 105 is configured with, for example, a static random access memory (SRAM), which requires a backup power source. Furthermore, the RAM 105 causes data to be retained by a primary battery for data backup (not illustrated) and is, therefore, able to store important data, such as program control variables, without volatilizing such data. Moreover, a memory area for storing, for example, setting information about the information processing apparatus 101 or management data about the information processing apparatus 101 is also provided in the RAM 105. Moreover, the RAM 105 is also used as a main memory and a work memory for the CPU 103.

The external storage device 106 stores, for example, an application program for performing network setup of a communication apparatus 151 (hereinafter referred to as a "setting application") and a printing information generation program for generating printing information which is interpretable by the communication apparatus 151. The setting application is an application program for performing setting of an access point serving as a connection destination of the communication apparatus 151 with use of, for example, WEC. Furthermore, the setting application can be configured to further include a function other than the network setup function. For example, the setting application can be configured to further include a function for causing the communication apparatus 151 to perform printing, a function for causing an original set on the communication apparatus 151 to be scanned, or a function for checking the state of the communication apparatus 151. For example, the setting application is stored in the external storage device 106 by being installed from an external server by the Internet communication via the communication unit 110. Moreover, the external storage device 106 stores various programs, such as an information transmission and reception control program for performing transmission and reception between the information processing apparatus 101 and the communication apparatus 151, to which the information processing apparatus 101 is connecting via the communication unit 110, and various pieces of information which these programs use.

The output interface 107 is an interface which performs control for the display unit 108 to perform displaying of data and perform notification of the state of the information processing apparatus 101.

The display unit 108 is configured with, for example, a light-emitting diode (LED) or a liquid crystal display (LCD), and performs displaying of data and notification of the state of the information processing apparatus 101.

The communication unit 110 is a configuration which connects to apparatuses, such as the communication apparatus 151 and an access point 131, to perform data communication. For example, the communication unit 110 is able to connect to an access point (not illustrated) included in the communication apparatus 151. By the communication unit 110 and the access point included in the communication apparatus 151 connecting to each other, the information processing apparatus 101 and the communication apparatus 151 become able to communicate with each other. Furthermore, the communication unit 110 can be configured to directly communicate with the communication apparatus 151 via wireless communication, and can be configured to communicate with the communication apparatus 151 via an external device present outside of the information processing apparatus 101 or the communication apparatus 151. Furthermore, the external device includes an external access point (e.g., the access point 131) present outside of the information processing apparatus 101 and the communication apparatus 151 and a device which is other than an access point and is able to relay communication. In the present exemplary embodiment, the wireless communication method which the communication unit 110 uses is assumed to be Wi-Fi® (Wireless Fidelity), which is a communication standard compliant with the IEEE 802.11 series. Then, the above-mentioned WEC is assumed to be executed by the communication unit 110 performing communication. Moreover, examples of the access point 131 include devices such as a wireless local area network (LAN) router. Furthermore, in the present exemplary embodiment, a method in which the information processing apparatus 101 and the communication apparatus 151 directly connect to each other without via an access point is referred to as a "direct connection method". Moreover, a method in which the information processing apparatus 101 and the communication apparatus 151 connect to each other via an access point is referred to as an "infrastructure connection method".

The short-range wireless communication unit 111 is a configuration which wirelessly connects to an apparatus such as the communication apparatus 151 at close range to perform data communication, and performs communication by a communication method different from that of the communication unit 110. The short-range wireless communication unit 111 is able to connect to, for example, a short-range wireless communication unit 157 included in the communication apparatus 151. Examples of the communication method which the short-range wireless communication unit 111 uses include Near Field Communication (NFC), Bluetooth® Classic, Bluetooth® Low Energy (BLE), and Wi-Fi Aware™.

The image capturing unit 112 is a camera, and acquires image data by performing image capturing. In the present exemplary embodiment, as described below, the image capturing unit 112 performs image capturing of a QR Code®, thus acquiring image data including a QR Code®.

In the present exemplary embodiment, the information processing apparatus 101 executes WEC by the function of the OS of the information processing apparatus 101 based on an execution instruction for network setup processing issued by the setting application.

The communication apparatus 151 serves as a communication apparatus in the present exemplary embodiment. The communication apparatus 151 includes, for example, a ROM 152, a RAM 153, a CPU 154, a print engine 155, a communication unit 156, and a short-range wireless communication unit 157. For example, the ROM 152, the RAM 153, and the CPU 154 are configured to form a computer of the communication apparatus 151.

The communication unit 156 includes, as an internal access point of the communication apparatus 151, an access point for connecting to an apparatus such as the information processing apparatus 101. Furthermore, the access point is able to connect to the communication unit 110 of the information processing apparatus 101. The communication unit 156 enabling the access point causes the communication apparatus 151 to operate as an access point. Furthermore, the communication unit 156 can wirelessly connect directly to the information processing apparatus 101 or can wirelessly connect to the information processing apparatus 101 via the access point 131. In the present exemplary embodiment, the wireless communication method which the communication unit 156 uses is assumed to be a communication standard compliant with the IEEE 802.11 series. Moreover, in the following description, Wi-Fi® (Wireless Fidelity) is a communication standard compliant with the IEEE 802.11 series. Moreover, if the communication apparatus 151 is compatible with WEC, the above-mentioned WEC is assumed to be executed by the communication unit 156 performing communication. Moreover, the communication unit 156 can include hardware operating as an access point, or can operate as an access point by software for causing the communication unit 156 to operate as an access point.

The communication apparatus 151 in the present exemplary embodiment is able to operate in an infrastructure mode and a peer to peer (P2P) mode, which are modes (states) for performing communication using the communication unit 156.

The infrastructure mode is a form in which the communication apparatus 151 performs communication with another apparatus such as the information processing apparatus 101 via an external device (e.g., the access point 131) forming a network. A connection to an external access point which is established by the communication apparatus 151 operating in the infrastructure mode is referred to as "infrastructure connection". In the present exemplary embodiment, in infrastructure connection, the communication apparatus 151 operates as a slave station and the external access point operates as a master station. Furthermore, in the present exemplary embodiment, the master station is a device which determines a communication channel for use in a network to which the master station belongs, and the slave station is a device which does not determine a communication channel for use in a network to which the slave station belongs but uses the communication channel which the master station has determined.

The P2P mode is a form in which the communication apparatus 151 directly communicates with another apparatus such as the information processing apparatus 101 without via an external device forming a network. In the present exemplary embodiment, the P2P mode is assumed to include an access point (AP) mode in which the communication apparatus 151 operates as an access point. Connection information (a service set identifier (SSID) or a password) about an access point which is enabled within the communication apparatus 151 in the AP mode is assumed to be optionally settable by the user. Furthermore, the P2P mode can include, for example, a Wi-Fi Direct® (WFD) mode for the communication apparatus 151 to perform communication by Wi-Fi Direct® (WFD). Furthermore, which of a plurality of WFD-compatible devices operates as a master station is determined according to, for example, a sequence called "group owner negotiation". Furthermore, a master station can be determined without the group owner negotiation being performed. An apparatus which is a WFD-compatible device and functions as a master station is particularly referred to as a "group owner". A direct contact with another apparatus which is established by the communication apparatus 151 operating in the P2P mode is referred to as "direct connection". In the present exemplary embodiment, in the direct connection, the communication apparatus 151 operates as a master station and another apparatus operates as a slave station.

Moreover, in the present exemplary embodiment, the communication apparatus 151 is able to operate in a network setup mode, which is a mode for performing network setup of the communication apparatus 151 with a predetermined communication protocol (a communication protocol for setup), based on receiving a predetermined operation from the user. When operating in the network setup mode, the communication apparatus 151 uses the communication unit 156 to operate as a setup access point which is enabled during the process of operating in the network setup mode. The setup access point is an access point different from an access point which is enabled during the above-mentioned AP mode. Moreover, the SSID of the setup access point is assumed to include a predetermined character string which is recognizable by the setting application of the information processing apparatus 101. Moreover, the setup access point is assumed to be an access point which does not require a password for connection. Moreover, the communication apparatus 151 operating in the network setup mode is assumed to use a communication protocol for setup in performing communication with the information processing apparatus 101 connecting to the setup access point. Specifically, the communication protocol for setup is, for example, Simple Network Management Protocol (SNMP). After starting an operation in the network setup mode, the communication apparatus 151 stops an operation in the network setup mode, thus disabling the setup access point, when a time-out period for the network setup mode has elapsed. This is because, since the setup access point is an access point which does not require a password as mentioned above, if the setup access point is enabled for a long time, the possibility of receiving a request for connection from an inappropriate apparatus may increase. Furthermore, the setup access point can be an access point which requires a password. In that case, a password for use in connection with the setup access point is assumed to be a fixed (unchangeable by the user) password which the setting application previously recognizes.

Moreover, in the present exemplary embodiment, the communication apparatus 151 is able to further operate in a mode for performing network setup of the communication apparatus 151 with a communication protocol different from the communication protocol for setup, based on receiving a predetermined operation from the user. In the present exemplary embodiment, the communication protocol different from the communication protocol for setup is assumed to be the above-mentioned DPP, and the above-mentioned mode is referred to as a "DPP mode". When the communication apparatus 151 is in a state of operating in the DPP mode, in a case where a network setup request using the DPP has been received from the information processing apparatus 101, the communication apparatus 151 performs network setup using the DPP in a way described below. Therefore, the DPP mode is, in other words, a mode for awaiting a network setup request using the DPP. Moreover, after starting an operation in the DPP mode, the communication apparatus 151 stops an operation in the DPP mode, thus stopping awaiting of a network setup request using the DPP, when a time-out period for the DPP mode has elapsed.

Furthermore, the time-out period for the DPP mode can be equal to the time-out period for the network setup mode, or can be longer than or shorter than the time-out period for the network setup mode. Moreover, in the present exemplary embodiment, the communication apparatus 151 starts an operation in the DPP mode based on an operation for displaying a two-dimensional code for causing the information processing apparatus 101 to acquire WEC-related information described below being performed. However, a timing or condition in which an operation in the DPP mode is started is not limited to this. For example, an operation in the DPP mode can be started based on an operation in the network setup mode being started or an operation for starting an operation in the network setup mode being performed.

The short-range wireless communication unit 157 is a configuration which wirelessly connects to an apparatus such as the information processing apparatus 101 at close range, and is able to connect to the short-range wireless communication unit 111 included in the information processing apparatus 101. Examples of the communication method which the short-range wireless communication unit 157 uses include NFC, Bluetooth® Classic, Bluetooth® Low Energy, and Wi-Fi Aware™.

The RAM 153 is configured with, for example, an SRAM, which requires a backup power source. Furthermore, the RAM 153 causes data to be retained by a primary battery for data backup (not illustrated) and is, therefore, able to store important data, such as program control variables, without volatilizing such data. Moreover, a memory area for storing, for example, setting information about the communication apparatus 151 or management data about the communication apparatus 151 is also provided in the RAM 153. Moreover, the RAM 153 is also used as a main memory and a work memory for the CPU 154, and serves as a receive buffer for temporarily storing printing information received from, for example, the information processing apparatus 101 and stores various pieces of information.

The ROM 152 stores fixed data such as control programs, data tables, and an OS program, which the CPU 154 executes. In the present exemplary embodiment, the control programs stored in the ROM 152 are used to perform software execution control, such as scheduling, task switching, and interrupt processing, under the control of the built-in OS stored in the ROM 152.

The CPU 154 is a system control unit, and controls the entire communication apparatus 151.

The print engine 155 forms an image on a recording medium such as paper by applying a recording agent such as ink to the recording medium based on information stored in the RAM 153 or a print job received from, for example, the information processing apparatus 101, and thus outputs a print result. Furthermore, since, generally, the amount of data of a print job transmitted from, for example, the information processing apparatus 101 is large, the communication for a print job requires using a communication method capable of performing high-speed communication. Therefore, the communication apparatus 151 receives a print job via the communication unit 156, which is capable of performing higher-speed communication than the short-range wireless communication unit 157.

Furthermore, a memory, such as an external hard disk drive (HDD) or a Secure Digital (SD) card, can be mounted as an optional device on the communication apparatus 151, and information to be stored in the communication apparatus 151 can be stored in such a memory.

In the present exemplary embodiment, as mentioned above, network setup using the DPP is assumed to be able to be performed. Furthermore, to cause the communication apparatus 151 to perform network setup using the DPP, the information processing apparatus 101 needs to acquire WEC-related information. In the present exemplary embodiment, when having received a predetermined operation from the user, the communication apparatus 151 outputs a two-dimensional code (in the present exemplary embodiment, a QR Code®) to be used for the information processing apparatus 101 to acquire WEC-related information. Then, the information processing apparatus 101 performs image capturing of the output QR Code® and analysis of the QR Code® obtained by image capturing, thus acquiring WEC-related information. Moreover, to perform network setup using the DPP, the communication apparatus 151 needs to operate in the DPP mode. Furthermore, in the case of a form in which the communication apparatus 151 always operates in the DPP mode, the possibility of a network setup request using the DPP being received from an information processing apparatus which a user who is not the user of the communication apparatus 151 operates increases. Therefore, it is desirable that an operation in the DPP mode be started at appropriate timing. Thus, in the present exemplary embodiment, a form in which the communication apparatus 151 starts an operation in the DPP mode at appropriate timing is described. Specifically, the communication apparatus 151 is assumed to start an operation in the DPP mode at timing of performing outputting of a QR Code®. This is because the timing at which a QR Code® is output is timing at which the user of the communication apparatus 151 has operated the communication apparatus 151 and is timing in which the possibility of a network setup request using the DPP being received from an information processing apparatus which the user of the communication apparatus 151 operates is high.

Network setup processing using the DPP, which is performed by the information processing apparatus 101 and the communication apparatus 151, is described with reference to FIG. 2. The sequence illustrated in FIG. 2 is implemented by, for example, a CPU of each apparatus reading out a program stored in, for example, a ROM of each apparatus or an external storage device onto a RAM of each apparatus and executing the program. Furthermore, the present sequence is assumed to be started in a state in which the communication apparatus 151 is operating in the DPP mode.

Figure 6:
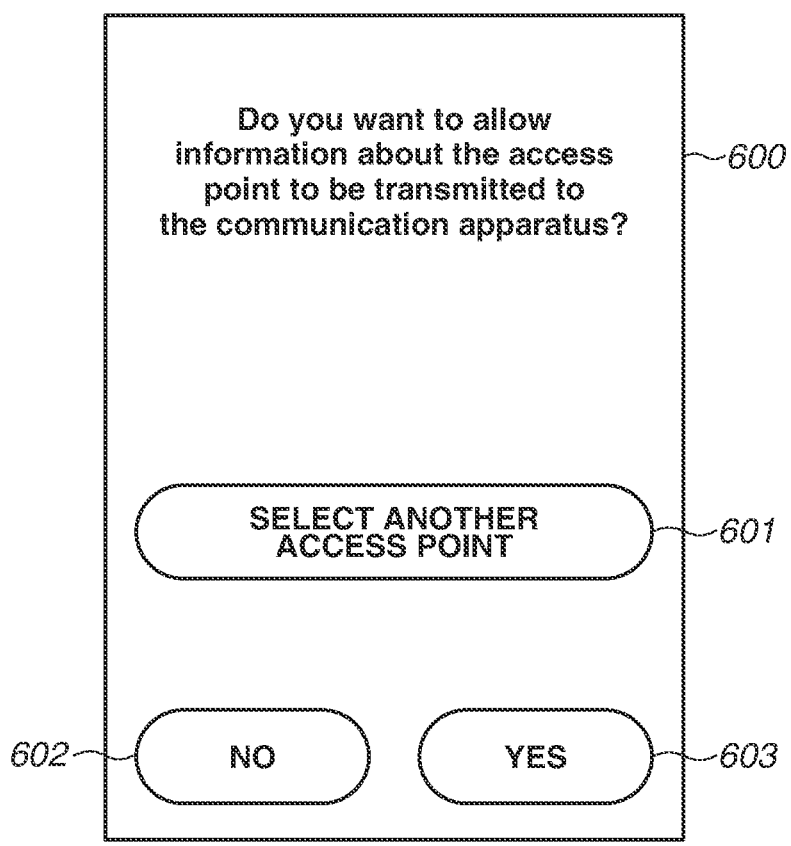
FIG. 6 is a diagram illustrating an example of a Wi-Fi Easy Connect™ (WEC) start screen.

First, in step S200, the information processing apparatus 101 starts WEC using the DPP by the function of an OS. Specifically, first, the information processing apparatus 101 issues a starting instruction for a WEC application program included as standard in the OS (hereinafter referred to as a "WEC application") from the setting application to the OS, thus starting the WEC application. This causes the WEC application to operate in the foreground and causes the setting application to operate in the background. Furthermore, for example, execution of the starting instruction is equivalent to an instruction for executing WEC. With this processing, the information processing apparatus 101 displays a WEC start screen using the WEC application. Furthermore, the WEC application is a program which is previously installed on the information processing apparatus 101 and is a program which is provided by the OS vendor of the information processing apparatus 101. Moreover, in a case where the WEC application has been started, the WEC-related information acquired by the setting application is provided to the WEC application. FIG. 6 illustrates an example of a WEC start screen which is displayed by the WEC application. The WEC start screen 600 has areas 601, 602, and 603 displayed therein. The area 601 is an area for changing an access point which is set as a setting target using WEC. Furthermore, before the area 601 is operated, the access point which is set as a setting target using WEC is an access point to which the information processing apparatus 101 is currently connecting. In a case where the area 601 has been selected, the information processing apparatus 101 displays a list of access points and sets a new access point selected from the list by the user as a setting target using WEC. Furthermore, the list of access points is assumed to include, for example, an access point discovered by an AP search performed by the information processing apparatus 101 and an access point to which the information processing apparatus 101 has ever connected. The area 602 is an area for cancelling execution of WEC, and the area 603 is an area for issuing an instruction for execution of WEC. If the area 602 has been operated, the information processing apparatus 101 ends processing in the present sequence diagram. Furthermore, in this case, WEC is deemed to be failed. Moreover, if the area 603 has been pressed, the information processing apparatus 101 advances the processing to step S201.

In step S201, the WEC application executes an application programming interface (API) for WEC with use of WEC-related information or information about an access point set as a target for setting by WEC, so that an instruction for execution of WEC is issued to the OS. Then, processing called DPP authentication is performed between the information processing apparatus 101 and the communication apparatus 151 by the function of the OS. In the DPP authentication, for example, authentication information and information for use in encrypting information are communicated between the information processing apparatus 101 and the communication apparatus 151, so that authentication of communication between the information processing apparatus 101 and the communication apparatus 151 is performed. Furthermore, various pieces of information which are transmitted from the information processing apparatus 101 in a communication performed in the DPP authentication are encrypted based on WEC-related information previously acquired by the information processing apparatus 101 with processing described below. In the DPP authentication, specifically, first, the information processing apparatus 101 transmits an authentication request as a network setup request using the DPP. Next, the communication apparatus 151, which operates in the DPP mode, is operating in the DPP mode, which is a mode for awaiting an authentication request, and, therefore, receives the authentication request transmitted from the information processing apparatus 101. The communication apparatus 151, having received the authentication request, tries to decode the received authentication request with a decryption key which the communication apparatus 151 itself retains. Then, when succeeding in the decryption, the communication apparatus 151 transmits an authentication response to the information processing apparatus 101, thus authenticating a communication with the information processing apparatus 101. Furthermore, in a case where the information processing apparatus 101 has not been able to acquire accurate WEC-related information and, thus, have not been able to accurately encrypt information, decryption in the communication apparatus 151 is failed, and, therefore, authentication is failed and the authentication response is not transmitted. Based on the authentication response being received by the information processing apparatus 101, the DPP authentication is completed. Moreover, in the DPP authentication, the DPP is used to perform communications.

Next, in step S202, processing called DPP configuration is performed between the information processing apparatus 101 and the communication apparatus 151 by the function of the OS. In the DPP configuration, the information processing apparatus 101 transmits, to the communication apparatus 151 by WEC, connection information for connecting to an access point set as a setting target by WEC. Furthermore, the connection information includes, for example, the SSID and password of an access point set as a setting target by WEC and an encryption method. The password to be transmitted at this time is information input by the user on a screen which an application compatible with the OS displays when a connection between the information processing apparatus 101 and the access point is established.

Then, the password is information retained by the OS when a connection between the information processing apparatus 101 and the access point has been established. Moreover, the password is information which the setting application is not retaining.

Moreover, since the password to be transmitted at this time is information which the OS is already retaining and the DPP configuration is processing which is performed by the OS, the password does not need to be newly input by the user on a screen which the setting application displays. Transmitting connection information by WEC as in the present exemplary embodiment enables transmitting a password to the communication apparatus 151 without newly receiving inputting of a password from the user on a screen which the setting application displays and with use of a secure communication. Furthermore, even in the DPP configuration, a communication is performed with use of the DPP.

Furthermore, in the present exemplary embodiment, communications in the DPP authentication and the DPP configuration are performed with the respective apparatuses transmitting beacon signals. Moreover, in the present exemplary embodiment, the communication apparatus 151 receives a beacon signal transmitted from the information processing apparatus 101 in the DPP authentication and the DPP configuration by a network interface for infrastructure connection.

In step S203, the communication apparatus 151 ends the network setup mode and transitions to the infrastructure mode. Then, the communication apparatus 151 uses connection information acquired by WEC to try to connect to an access point corresponding to the connection information. In a case where the connection is successful, since then, the communication apparatus 151 becomes able to perform communication via a network which the connected access point forms. Furthermore, the communication which is performed via a network which the connected access point forms is performed according to a protocol different from the DPP (specifically, for example, Port9100, Simple Network Management Protocol (SNMP), or a vendor-specific protocol of the communication apparatus 151). Furthermore, the communication apparatus 151 can transmit, to the information processing apparatus 101, information indicating the success or failure of a connection to an access point corresponding to connection information acquired by WEC. Moreover, in a case where the connection to an access point corresponding to connection information acquired by WEC is failed, the communication apparatus 151 can further transmit, to the information processing apparatus 101, information indicating the cause of such a failure. Moreover, these information transmissions can be performed with use of the DPP. Furthermore, examples of the cause of a failure in connection to an access point corresponding to connection information acquired by WEC include an error in communication in WEC, the corresponding access point being undiscoverable, and WEC-related information acquired from the communication apparatus 151 being inappropriate information. Moreover, examples of such a cause include an encryption method for use in connecting to an access point set as setting target by WEC being an encryption method with which the communication apparatus 151 is not compatible. Moreover, examples of such a cause include an encryption method for use in connecting to an access point set as setting target by WEC being an encryption method with which WEC is not compatible.

In step S204, based on execution of WEC being ended, the information processing apparatus 101 switches an application operating in the foreground from the WEC application to the setting application. Then, the information processing apparatus 101 searches for the communication apparatus 151 on a network to which the information processing apparatus 101 itself belongs. The present processing is implemented by the setting application having received, from the OS, a notification indicating that execution of WEC has been ended. Then, in a case where the communication apparatus 151 has been discovered, the information processing apparatus 101 requests capability information from the communication apparatus 151, and the communication apparatus 151 transmits capability information to the information processing apparatus 101. With this processing, the information processing apparatus 101 registers information about the communication apparatus 151 on the setting application, and, since then, becomes able to perform communication with the communication apparatus 151 by the setting application. Specifically, for example, the information processing apparatus 101 becomes able to transmit a print job to the communication apparatus 151 by the setting application. Furthermore, at this time, in a case where the information processing apparatus 101 belongs to a network formed by an access point to which the communication apparatus 151 has connected by WEC, the information processing apparatus 101 becomes able to perform communication with the communication apparatus 151 via the access point. Moreover, in a case where a communication between the information processing apparatus 101 and the communication apparatus 151 is not able to be performed, such as a case where an access point to which the communication apparatus 151 has connected is not an access point to which the information processing apparatus 101 is connecting, a request or acquisition of capability information is omitted. Furthermore, a communication in step S204 is performed with used of, for example, a communication protocol different from both the DPP and a communication protocol for setup (specifically, for example, Canon HTTP Management Protocol (CHMP)).

Furthermore, while, in the above description, a configuration in which the WEC start screen is displayed by the WEC application and the WEC application executes the API for WEC to instruct the OS to execute WEC has been described, the present exemplary embodiment is not limited to this configuration. For example, the WEC start screen can be configured to be displayed by the setting application. Moreover, a configuration in which the setting application executes the API for WEC to instruct the OS to execute WEC can be employed.

Moreover, as mentioned above, in the present exemplary embodiment, the communication apparatus 151 is also able to perform network setup by not the DPP but the SNMP. Therefore, next, network setup processing by the SNMP which is performed by the information processing apparatus 101 and the communication apparatus 151 is described with reference to FIG. 3. The sequence illustrated in FIG. 3 is implemented by, for example, a CPU of each apparatus reading out a program stored in, for example, a ROM of each apparatus or an external storage device onto a RAM of each apparatus and executing the program. Furthermore, as mentioned above, a communication protocol for setup is used in a communication performed via a Wi-Fi® connection between the communication apparatus 151 operating in the network setup mode and the information processing apparatus 101.

In step S300, the information processing apparatus 101 requests a list of access points from the communication apparatus 151 via a Wi-Fi® connection between the communication apparatus 151 operating in the network setup mode and the information processing apparatus 101, by the setting application.

Next, in step S301, the communication apparatus 151 transmits a list of access points to the information processing apparatus 101 via a Wi-Fi® connection between the communication apparatus 151 operating in the network setup mode and the information processing apparatus 101. Furthermore, the list to be transmitted here is a list showing one or a plurality of access points to which the communication apparatus 151 is able to connect, which has been discovered by the communication apparatus 151 performing access point (AP) search.

Next, in step S302, the information processing apparatus 101 transmits, to the communication apparatus 151, connection information about any one of access points included in the received list via a Wi-Fi® connection between the communication apparatus 151 operating in the network setup mode and the information processing apparatus 101.

Furthermore, the present processing is implemented by the setting application controlling the information processing apparatus 101 in such a way as to transmit connection information about any one of access points included in the received list. In the present processing, specifically, in a case where a connected AP is included in the received list, the information processing apparatus 101 transmits connection information about the connected AP. In the present exemplary embodiment, since only access points to which the communication apparatus 151 is able to connect are included in the list, a case where a connected AP is included in the received list is thus a case where the communication apparatus 151 is able to connect to the connected AP. Moreover, in a case where the connected AP is not included in the received list, the information processing apparatus 101 displays the received list and receives, from the user, selection of any one of access points from the list.

Then, the information processing apparatus 101 transmits connection information about the selected access point. In the present exemplary embodiment, since only access points to which the communication apparatus 151 is able to connect are included in the list, a case where the connected AP is not included in the received list is thus a case where the communication apparatus 151 is not able to connect to the connected AP. Moreover, an access point which is connectable by an encryption method incompatible with the communication apparatus 151 is an access point to which the communication apparatus 151 is not able to connect and is, therefore, not included in the list. Moreover, an access point which is connectable by a frequency band incompatible with the communication apparatus 151 is an access point to which the communication apparatus 151 is not able to connect and is, therefore, not included in the list. Therefore, in step S424 described below, which is performed in the case of NO in step S411 described below or in the case of NO in step S413 described below, connection information about an access point different from the connected AP is transmitted as a result. Furthermore, in the case of NO in step S412 described below, since the connected AP and the communication apparatus 151 may be able to connect to each other, connection information about the connected AP is likely to be transmitted or connection information about an access point different from the connected AP is likely to be transmitted. Furthermore, the present exemplary embodiment is not limited to this configuration, and a configuration in which a list is always displayed and selection of an access point is received from the user each time can be employed. Furthermore, before connection information is transmitted, the information processing apparatus 101 receives, from the user, inputting of a password for connecting to an access point on a screen which the setting application displays. Then, the information processing apparatus 101 causes the received password to be included in connection information and then transmits the connection information.

In step S303, the communication apparatus 151 communicates reception of the connection information to the information processing apparatus 101 via a Wi-Fi® connection between the communication apparatus 151 operating in the network setup mode and the information processing apparatus 101.

In step S304, the communication apparatus 151 ends the network setup mode and then transitions to the infrastructure mode. Then, the communication apparatus 151 uses the connection information acquired in step S302 to try to connect to an access point corresponding to the connection information. In a case where the connection is successful, since then, the communication apparatus 151 becomes able to perform communication via a network which the connected access point forms.

In step S305, the information processing apparatus 101 reconnects to an access point to which the information processing apparatus 101 has been connecting when a setting operation has been performed, with use of stored connection information, by the setting application. Furthermore, the present exemplary embodiment is not limited to this configuration. For example, in a case where, when the setting operation has been performed, for example, the information processing apparatus 101 has previously transmitted, to the communication apparatus 151, connection information about an access point different from the access point to which the information processing apparatus 101 has been connecting by Wi-Fi®, the information processing apparatus 101 can connect to such a different access point.

In step S306, the information processing apparatus 101 searches for the communication apparatus 151 on a network to which the information processing apparatus 101 itself belongs, by the setting application. Then, in a case where the communication apparatus 151 has been discovered, the information processing apparatus 101 requests capability information from the communication apparatus 151, and the communication apparatus 151 transmits capability information to the information processing apparatus 101. With this processing, the information processing apparatus 101 registers information about the communication apparatus 151 on the setting application, and, since then, becomes able to perform communication with the communication apparatus 151 by the setting application. Specifically, for example, the information processing apparatus 101 becomes able to transmit a print job to the communication apparatus 151 by the setting application. Furthermore, at this time, in a case where the information processing apparatus 101 belongs to a network formed by an access point to which the communication apparatus 151 has connected by network setup, the information processing apparatus 101 becomes able to perform communication with the communication apparatus 151 via the access point. Furthermore, in a case where a communication between the information processing apparatus 101 and the communication apparatus 151 is not able to be performed, such as a case where an access point to which the communication apparatus 151 has connected is not an access point to which the information processing apparatus 101 is connecting, a request or acquisition of capability information is omitted. Furthermore, a communication in step S306 is performed with used of, for example, a communication protocol different from both the DPP and a communication protocol for setup (specifically, for example, CHMP). Then, the information processing apparatus 101 ends the processing in the present sequence.

Furthermore, the content of processing in the above-described sequence is not limited to the above-described content. For example, the information processing apparatus 101 can be configured not to transmit connection information about an access point and can be configured not to try to establish a connection between the communication apparatus 151 and the access point. Instead, the information processing apparatus 101 can be configured to receive, from the communication apparatus 151, connection information about an access point which is enabled within the communication apparatus 151 during the AP mode and then try to establish a connection between the communication apparatus 151 operating in the AP mode and the information processing apparatus 101. In the case of such a configuration, after transmitting connection information about an access point which is enabled within the communication apparatus 151 during the AP mode, the communication apparatus 151 ends the network setup mode and then transitions to the AP mode. Furthermore, this processing can be, for example, processing which is performed in a case where an access point to which the information processing apparatus 101 has been connecting by Wi-Fi® when the setting operation has been performed is not included in the received list.

FIGS. 4A and 4B are flowcharts illustrating the flow of processing which the information processing apparatus 101 performs in the network setup processing in the present exemplary embodiment. The flowcharts of FIGS. 4A and 4B are implemented by the CPU 103 reading out a setting application stored in, for example, the ROM 104 or an external storage device onto the RAM 105 and executing the setting application. Moreover, the flowcharts of FIGS. 4A and 4B are started in response to a predetermined operation for network setup (hereinafter referred to as a "setting operation") being performed in a screen which the setting application displays.

First, in step S400, the CPU 103 acquires information about an access point to which the information processing apparatus 101 has been connecting by Wi-Fi® at least when the setting operation has been performed (hereinafter referred to as a "connected AP"). Furthermore, in the present exemplary embodiment, since, after the setting operation has been performed, the information processing apparatus 101 is not performing switching of an access point serving as a connection destination, the access point is also an access point to which the information processing apparatus 101 is currently connecting in step S400. The information to be acquired includes information for connecting to an access point to which the information processing apparatus 101 is wirelessly connecting by Wi-Fi® (e.g., an SSID or information indicating an encryption method). Furthermore, the acquired information is stored in a predetermined storage region of a memory included in the information processing apparatus 101. Furthermore, in a case where, when the setting operation has been performed, the information processing apparatus 101 is not connecting to any access point by Wi-Fi®, the present processing is omitted.

Next, in step S401, the CPU 103 instructs the OS of the information processing apparatus 101 to search for access points near the information processing apparatus 101, and acquires a result of the search from the setting application.

Next, in step S402, the CPU 103 determines whether an access point which is enabled by the communication apparatus 151 operating in the network setup mode is present in the search result acquired in step S401. As mentioned above, in the present exemplary embodiment, the SSID of an access point which is enabled by the communication apparatus 151 operating in the network setup mode includes a predetermined character string previously recognized by the setting application. Therefore, in the present determination, specifically, the CPU 103 determines whether an access point having an SSID including the predetermined character string is present in the search result acquired in step S401. If the result of determination in step S402 is yes (YES in step S402), the CPU 103 advances the processing to step S403, and, if the result of determination in step S402 is no (NO in step S402), the CPU 103 advances the processing to step S419.

In step S403, the CPU 103 tries to establish a Wi-Fi® connection between the access point which is enabled by the communication apparatus 151 operating in the network setup mode, included in the search result, and the information processing apparatus 101. Furthermore, the Wi-Fi® connection to be established is equivalent to a Wi-Fi connection between the communication apparatus 151 operating in the network setup mode and the information processing apparatus 101.

Next, in step S404, the CPU 103 determines whether the establishment of the Wi-Fi® connection in step S403 is successful. If the result of determination in step S404 is yes (YES in step S404), the CPU 103 advances the processing to step S405, and, if the result of determination in step S404 is no (NO in step S404), the CPU 103 advances the processing to step S419.

In step S405, the CPU 103 acquires capability information about the information processing apparatus 101 from the OS. In the present exemplary embodiment, the capability information includes information indicating whether the information processing apparatus 101 is compatible with WEC. Furthermore, the content of capability information differs depending on, for example, the model or model number of the information processing apparatus 101.

Next, in step S406, the CPU 103 determines whether the information processing apparatus 101 is connecting to an access point by Wi-Fi® when the setting operation has been performed and the information processing apparatus 101 is compatible with WEC. Here, for example, in a case where the information processing apparatus 101 is not connecting to an access point by Wi-Fi® when the setting operation has been performed, the result of determination becomes no. Moreover, for example, in a case where, while the information processing apparatus 101 is connecting to an access point by Wi-Fi® when the setting operation has been performed, the information processing apparatus 101 is not compatible with WEC, the result of determination becomes no. Furthermore, whether the information processing apparatus 101 is connecting to an access point by Wi-Fi® when the setting operation has been performed is determined based on whether information about the connected AP is currently stored in the above-mentioned predetermined storage region. Moreover, whether the information processing apparatus 101 is compatible with WEC is determined based on the content of capability information acquired in step S405. If the result of determination in step S406 is yes (YES in step S406), the CPU 103 advances the processing to step S407, and, if the result of determination in step S406 is no (NO in step S406), the CPU 103 advances the processing to step S424.

In step S407, the CPU 103 tries to acquire various pieces of information from the communication apparatus 151 via a Wi-Fi® connection between the access point which is enabled by the communication apparatus 151 operating in the network setup mode and the information processing apparatus 101. Furthermore, as mentioned above, in a communication performed via a Wi-Fi® connection between the access point which is enabled by the communication apparatus 151 operating in the network setup mode and the information processing apparatus 101, a communication protocol for setup is used. Moreover, the information to be acquired here includes, for example, the above-mentioned WEC-related information and information indicating whether the communication apparatus 151 is compatible with WEC. Furthermore, in a case where the communication apparatus 151 is not compatible with WEC, information indicating that the communication apparatus 151 is not compatible with WEC is acquired, so that WEC-related information is not acquired. Moreover, in a case where the communication apparatus 151 is not compatible with WEC, neither WEC-related information nor information indicating whether the communication apparatus 151 is compatible with WEC may be acquired. Generally, WEC-related information can be acquired by the communication apparatus 151 displaying a QR Code® corresponding to the WEC-related information on a display unit and the information processing apparatus 101 reading the QR Code® with, for example, a camera unit. However, in the present exemplary embodiment, in step S407, WEC-related information is acquired via a Wi-Fi® connection between the access point which is enabled by the communication apparatus 151 operating in the network setup mode and the information processing apparatus 101. With this configuration, even if the communication apparatus 151 does not have a display unit for displaying a QR Code® or the information processing apparatus 101 does not have a camera unit for reading a QR Code®, the information processing apparatus 101 becomes able to acquire WEC-related information.

Next, in step S408, the CPU 103 determines whether the communication apparatus 151 is compatible with WEC, based on the information acquired in step S407. In a case where information indicating that the communication apparatus 151 is compatible with WEC has been acquired, the result of determination becomes yes, and, in a case where information indicating that the communication apparatus 151 is compatible with WEC has not been acquired, the result of determination becomes no. If the result of determination in step S408 is yes (YES in step S408), the CPU 103 advances the processing to step S409, and, if the result of determination in step S408 is no (NO in step S408), the CPU 103 advances the processing to step S424. Furthermore, in a case where information has not been acquired in step S407, the result of determination in step S408 becomes no.

Next, in step S409, the CPU 103 determines whether WEC-related information has been able to be acquired from the communication apparatus 151 in step S407. If the result of determination in step S409 is yes (YES in step S409), the CPU 103 advances the processing to step S410, and, if the result of determination in step S409 is no (NO in step S409), the CPU 103 advances the processing to step S422. Furthermore, a case where the result of determination in step S409 becomes no is, for example, a case where, while information indicating that the communication apparatus 151 is compatible with WEC has been acquired, WEC-related information has not been acquired due to, for example, a communication error.

In step S410, the CPU 103 acquires capability information about the communication apparatus 151 via a Wi-Fi® connection between the access point which is enabled by the communication apparatus 151 operating in the network setup mode and the information processing apparatus 101. In the present exemplary embodiment, the capability information about the communication apparatus 151 is assumed to include information indicating an encryption method with which the communication apparatus 151 is compatible and information indicating a frequency band with which the communication apparatus 151 is compatible. The encryption method with which the communication apparatus 151 is compatible is, for example, Wi-Fi Protected Access® (WPA), Wi-Fi Protected Access® II (WPA2), or Wi-Fi Protected Access® 3 (WPA3). Moreover, the information indicating a frequency band with which the communication apparatus 151 is compatible can be information indicating a frequency channel corresponding to a frequency band with which the communication apparatus 151 is compatible. Furthermore, in a configuration in which, as described below, a determination concerning an encryption method with which the communication apparatus 151 is compatible or a determination concerning a frequency band with which the communication apparatus 151 is compatible is not performed, the present processing can be omitted. Furthermore, the capability information can be previously included in the setting application. Thus, the CPU 103 can specify capability information corresponding to the communication apparatus 151 from among a plurality of pieces of capability information prepared for each type or model number of each communication apparatus previously included in the setting application and acquire the specified capability information from the setting application.

Next, in step S411, the CPU 103 determines whether the encryption method which has been used for connection to the connected AP is an encryption method with which the communication apparatus 151 is compatible, based on the capability information acquired in step S410. Furthermore, in the present exemplary embodiment, the encryption method with which the communication apparatus 151 is compatible is WPA, WPA2, or WPA3, and the encryption method with which the communication apparatus 151 is not compatible is Wired Equivalent Privacy (WEP). If the result of determination in step S411 is yes (YES in step S411), the CPU 103 advances the processing to step S412, and, if the result of determination in step S411 is no (NO in step S411), the CPU 103 advances the processing to step S424. Furthermore, the present determination can be performed at different timing. Specifically, for example, the present determination can be performed after the result of determination in step S404 is yes, and, if the result of determination is yes, the CPU 103 can advance the processing to step S405 and, if the result of determination is no, the CPU 103 can advance the processing to step S424.

Next, in step S412, the CPU 103 determines whether the encryption method which has been used for connection to the connected AP is an encryption method compatible with WEC (compatible with the DPP). Furthermore, the encryption method compatible with WEC is, for example, WPA2 or WPA3, and the encryption method incompatible with WEC is, for example, WPA or WEP. Furthermore, the CPU 103 can recognize which is the encryption method compatible with WEC, based on information which the setting application previously retains or based on information which is acquired from the communication apparatus 151. If the result of determination in step S412 is yes (YES in step S412), the CPU 103 advances the processing to step S413, and, if the result of determination in step S412 is no (NO in step S412), the CPU 103 advances the processing to step S424.

Next, in step S413, the CPU 103 determines whether the frequency band which has been used for connection to the connected AP is a frequency band with which the communication apparatus 151 is compatible, based on the capability information acquired in step S410. Furthermore, in the present exemplary embodiment, the communication apparatus 151 is assumed to include a type which is compatible with both a frequency band of 2.4 gigahertz (GHz) and a frequency band of 5 GHz and a type which is compatible with a frequency band of 2.4 GHz but is not compatible with a frequency band of 5 GHz.

Then, the communication apparatus 151 is not able to connect to an access point depending on a frequency band with which the communication apparatus 151 is not compatible. Therefore, for example, in a case where the frequency band which has been used for connection to the connected AP is a frequency band of 5 GHz and the communication apparatus 151 is not compatible with a frequency band of 5 GHz, the result of determination in step S413 becomes no. If the result of determination in step S413 is yes (YES in step S413), the CPU 103 advances the processing to step S414, and, if the result of determination in step S413 is no (NO in step S413), the CPU 103 advances the processing to step S424.

In step S414, the CPU 103 severs a Wi-Fi® connection between the access point which is enabled by the communication apparatus 151 operating in the network setup mode and the information processing apparatus 101.

next, in step S415, the CPU 103 re-establishes a connection between the access points to which the information processing apparatus 101 has been connecting by Wi-Fi® when the setting operation has been performed and the information processing apparatus 101. Furthermore, in WEC, information about an access point to which the information processing apparatus 101 is connecting during execution of WEC is transmitted. Therefore, the present processing is performed in preparation for execution of WEC in step S416.

next, in step S416, the CPU 103 performs processing for executing WEC with use of the acquired WEC-related information. Furthermore, in the present exemplary embodiment, the setting application does not directly execute WEC but performs starting an application for WEC as processing for executing WEC. Then, the API for WEC is executed by the application for WEC and, thus, an execution request for WEC is made to the OS, so that WEC is executed by the OS. Furthermore, the API for WEC can be executed by the setting application and, thus, an execution request for WEC can be made to the OS, and processing for executing WEC can be the execution request. In the present processing, the details of processing which the information processing apparatus 101 performs are as described above with reference to FIG. 2.

in step S417, the CPU 103 determines whether the establishment of a connection between the access point and the communication apparatus 151 is successful, by the executed WEC. The present determination is performed based on whether execution of WEC has been cancelled or based on information indicating the success or failure of a connection with the access point, acquired from the communication apparatus 151. If the result of determination in step S417 is yes (YES in step S417), the CPU 103 ends the processing, and, if the result of determination in step S417 is no (NO in step S417), the CPU 103 advances the processing to step S418.

In step S418, the CPU 103 determines whether a cause for the establishment of a connection between the access point and the communication apparatus 151 having been unsuccessful is a specific cause, by the executed WEC. Furthermore, in the present exemplary embodiment, information about a cause for the establishment of a connection between the access point and the communication apparatus 151 having been unsuccessful is assumed to be acquired from the communication apparatus 151 by the executed WEC, and the present determination is assumed to be performed based on the acquired information. Moreover, in the present exemplary embodiment, the specific cause is, for example, an error having occurred in a communication in WEC (cause 1) and an encryption method used for connection between the information processing apparatus 101 and the access point being an encryption method with which the communication apparatus 151 is not compatible (cause 2). Moreover, for example, the specific cause is an encryption method used for connection between the information processing apparatus 101 and the access point being an encryption method with which WEC is not compatible (cause 3). Furthermore, a failure resulting from the cause 2 or cause 3 may occur in a case where WEC has been executed after the result of determination in step S421 is yes. This is because, in a case where WEC is executed after the result of determination in step S421 is yes, unlike a case where WEC is executed after step S415, capability information about the communication apparatus 151 has not yet been acquired and the determination such as that in step S411 or step S412 has not been performed. If the result of determination in step S418 is yes (YES in step S418), the CPU 103 advances the processing to step S424, and, if the result of determination in step S418 is no (NO in step S418), the CPU 103 ends the processing.

Furthermore, processing in step S417 or step S418 can be omitted. Specifically, for example, after step S416, processing can be ended without step S417 or step S418 being performed. Moreover, in a case where the result of determination in step S417 is no, processing can be ended without step S418 being performed.

Next, step S419, which is performed if the result of determination in step S402 is no or if the result of determination in step S404 is no, is described. In step S419, the CPU 103 determines whether the information processing apparatus 101 has been connecting to an access point by Wi-Fi® when the setting operation has been performed. The present determination is performed based on whether information about an access point is currently stored in the above-mentioned predetermined storage region. If the result of determination in step S419 is yes (YES in step S419), the CPU 103 advances the processing to step S420, and, if the result of determination in step S419 is no (NO in step S419), the CPU 103 ends the processing.

Figure 7:
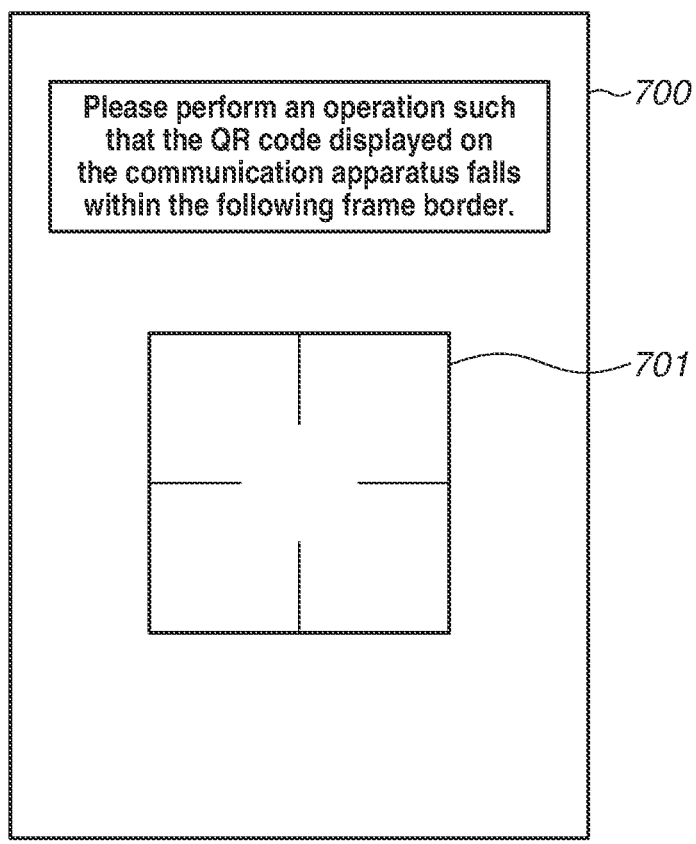
FIG. 7 is a diagram illustrating an example of a screen for QR Code® image capturing.

In step S420, the CPU 103 tries to acquire WEC-related information by a method different from the acquisition method for WEC-related information used in step S407. Specifically, for example, the CPU 103 tries to acquire WEC-related information by image capturing and reading of a QR Code®. FIG. 7 illustrates an example of a screen for QR Code® image capturing which the setting application displays. In the screen 700 for QR Code® image capturing, a frame 701 is displayed and, additionally, in the screen 700, an image which is being captured by a camera unit included in the information processing apparatus 101 is displayed. The user operates the information processing apparatus 101 in such a manner that a QR Code® which is being captured by the camera unit and which the communication apparatus 151 displays falls within the frame 701. In a case where it is detected that the QR Code® has fallen within the frame 701, the CPU 103 analyzes the QR Code® and thus acquires WEC-related information. Furthermore, the acquisition of WEC-related information is not limited to this configuration, and, for example, the CPU 103 can acquire WEC-related information from the communication apparatus 151 by Near-field communication (NFC) or Bluetooth® Low Energy (BLE). Furthermore, in a case where the communication apparatus 151 is not compatible with WEC, the communication apparatus 151 is not able to perform displaying of a QR Code® or transmission of WEC-related information by NFC or BLE. In that case, the CPU 103 ends the processing based on receiving a cancel operation on the setting application from the user.

Furthermore, the screen 700 for QR Code® image capturing can be displayed by an application other than the setting application (for example, an application for WEC or another application program for image capturing).

Next, in step S421, the CPU 103 determines whether WEC-related information has been able to be acquired in step S420.

If the result of determination in step S421 is yes (YES in step S421), the CPU 103 advances the processing to step S416, and, if the result of determination in step S421 is no (NO in step S421), the CPU 103 ends the processing. Furthermore, in a case where the QR Code® read in step S420 is not a QR Code® for causing WEC-related information to be acquired or in a case where reading of the QR Code® is failed, the result of determination in step S421 becomes no. Moreover, in a case where the result of determination in step S421 is no, the CPU 103 can be configured not to end the processing but to advances the processing to step S424. Moreover, in a case where the result of determination in step S421 is yes, the CPU 103 can determine whether the encryption method which has been used for connection to the connected AP is an encryption method compatible with WEC (compatible with the DPP). Then, if the result of determination in step S421 is yes, the CPU 103 can advance the processing to step S416, and, if the result of determination in step S421 is no, the CPU 103 can end the processing or can advance the processing to step S424. Furthermore, in this case, it is assumed that the CPU 103 is aware of which is an encryption method compatible with WEC, based on information previously retained by the setting application.

Next, step S422, which is performed in a case where the result of determination in step S409 is no, is described. In step S422, the CPU 103 severs a Wi-Fi® connection between the access point which is enabled by the communication apparatus 151 operating in the network setup mode and the information processing apparatus 101.

Next, in step S423, the CPU 103 re-establishes a connection between the access point to which the information processing apparatus 101 has been connecting by Wi-Fi® when the setting operation has been performed and the information processing apparatus 101. After that, the CPU 103 advances the processing to step S420 described above.

In this way, in the present exemplary embodiment, in a case where WEC-related information is not able to be acquired by a Wi-Fi® connection between the communication apparatus 151 operating in the network setup mode and the information processing apparatus 101, the CPU 103 tries to acquire WEC-related information by another method. Specifically, for example, the CPU 103 tries to acquire WEC-related information by reading of a QR Code®. With this processing, even in a case where WEC-related information is not able to be acquired by a Wi-Fi® connection between the communication apparatus 151 operating in the network setup mode and the information processing apparatus 101, the CPU 103 is able to execute WEC.

Next, step S424, which is performed in a case where the result of determination in step S406 is no, in a case where the result of determination in step S408 is no, in a case where the result of determination in step S412 is no, or in a case where the result of determination in step S418 is yes, is described. In step S424, the CPU 103 performs network setup of the communication apparatus 151 by a method different from WEC. In the present exemplary embodiment, the method different from WEC is a method of performing network setup of the communication apparatus 151 with use of a communication protocol for setup, which is a protocol different from the protocol for WEC (the DPP). In the present processing, the details of processing which the information processing apparatus 101 performs are as described above with reference to FIG. 3. After that, the CPU 103 ends the processing.

Furthermore, the content of processing in the above-described flowchart is not limited to the above-described content. For example, in a case where WEC-related information is not able to be acquired by a Wi-Fi® connection between the communication apparatus 151 operating in the network setup mode and the information processing apparatus 101, the CPU 103 can end the processing without trying to acquire WEC-related information by another method. The case where WEC-related information is not able to be acquired by a Wi-Fi® connection between the communication apparatus 151 operating in the network setup mode and the information processing apparatus 101 is, specifically, for example, a case where the result of determination in step S402 is no, a case where the result of determination in step S404 is no, or a case where the result of determination in step S409 is no. Thus, in a case where the result of determination in step S402 is no, in a case where the result of determination in step S404 is no, or in a case where the result of determination in step S409 is no, the CPU 103 can end the processing without performing subsequent processing (step S419 to step S423).

Moreover, for example, while, in the above description, two determinations in step S408 and step S409 are performed after step S407, the present exemplary embodiment is not limited to this configuration. For example, after step S407, instead of two determinations in step S408 and step S409, a determination as to whether WEC-related information has been acquired can be performed. Then, if the result of determination is yes, the CPU 103 can advance the processing to step S410, and, if the result of determination is no, the CPU 103 can advance the processing to step S424, so that a configuration in which processing in step S420 to step S422 is not performed can be employed.

Furthermore, in the present exemplary embodiment, an encryption method compatible with WEC is included in encryption methods with which the communication apparatus 151 is compatible. Therefore, a configuration in which the determination in step S411 is not performed can be employed. Specifically, for example, after step S410, without the determination in step S411 being performed, the determination in step S412 can be performed.

Moreover, for example, a configuration in which an encryption method with which the communication apparatus 151 is compatible is included in encryption methods compatible with WEC, such as a configuration in which the encryption method with which the communication apparatus 151 is compatible is only WPA3 and the encryption methods compatible with WEC are WPA2 and WPA3, can be employed. In that case, a configuration in which the determination in step S412 is not performed can be employed. Specifically, for example, after the result of determination in step S411 is yes, without the determination in step S412 being performed, the determination in step S413 or the processing in step S414 can be performed.

FIG. 5 is a flowchart illustrating processing in which the communication apparatus 151 starts an operation in the DPP mode and performs network setup by the DPP. The flowchart of FIG. 5 is implemented by, for example, the CPU 154 reading out a program stored in, for example, the ROM 152 onto the RAM 153 and executing the program. Moreover, the flowchart of FIG. 5 is started based on a predetermined instruction for outputting a QR Code® being received by the communication apparatus 151. Furthermore, the predetermined instruction can be an instruction which is received based on a predetermined operation being performed on the communication apparatus 151 by the user, or can be an instruction which is received based on a predetermined communication being performed from, for example, the information processing apparatus 101 to the communication apparatus 151.

In step S501, the CPU 154 determines an awaiting channel for communication by the DPP.

In step S502, the CPU 154 generates a public key. Furthermore, an awaiting channel which is determined in step S501 and a public key which is generated in step S502 are newly determined and generated each time a predetermined operation is received.

In step S503, the CPU 154 generates WEC-related information including information including the awaiting channel determined in step S501 and information indicating the public key generated in step S502.

In step S504, the CPU 154 generates a QR Code® for acquiring WEC-related information.

In step S505, the CPU 154 outputs the QR Code® generated in step S504. Furthermore, in the present exemplary embodiment, outputting of a QR Code® is assumed to be printing of the QR Code®. However, the present exemplary embodiment is not limited to this configuration, and outputting of a QR Code® can be displaying of the QR Code® on a display unit (not illustrated) included in the communication apparatus 151. Moreover, both printing and displaying of a QR Code® can be performed.

In step S506, the CPU 154 determines whether outputting of the QR Code® is successful. Furthermore, a case where outputting of the QR Code® is failed is, for example, a case where a recording medium (paper) or a recording agent (ink or toner) for use in printing, included in the communication apparatus 151, is lacking. If the result of determination in step S506 is no (NO in step S506) (outputting of the QR Code® being failed), the CPU 154 advances the processing to step S507, and, if the result of determination in step S506 is yes (YES in step S506) (outputting of the QR code being successful), the CPU 154 advances the processing to step S508.

In step S507, the CPU 154 displays a first error notification screen indicating that outputting of the QR Code® is failed. Furthermore, the first error notification screen can be, for example, a screen for advising the user to replenish the communication apparatus 151 with a recording medium or a recording agent for use in printing. After that, the CPU 154 advances the processing to step S514.

In step S508, the CPU 154 starts an operation in the DPP mode of the communication apparatus 151. Thus, the CPU 154 starts awaiting of a setup request using the DPP with use of the communication channel determined in step S501. In this way, in the present exemplary embodiment, the CPU 154 starts the DPP mode based on outputting of the QR Code® being successful (completed). Furthermore, the present exemplary embodiment is not limited to this configuration, and only needs to have a configuration in which the DPP mode is started at timing close to timing at which outputting of a QR Code® is performed. Therefore, for example, a configuration in which the DPP mode is started during outputting of a QR Code® based on starting of outputting of the QR Code® can be employed, or a configuration in which the DPP mode is started before outputting of a QR Code® based on a predetermined operation being performed can be employed. Moreover, in a case where the communication apparatus 151 has started an operation in the DPP mode, the CPU 154 starts counting an elapsed time of the operation in the DPP mode.

In step S509, the CPU 154 determines whether a setup request using the DPP has been received from the information processing apparatus 101. If the result of determination in step S509 is no (NO in step S509), the CPU 154 advances the processing to step S510, and, if the result of determination in step S509 is yes (YES in step S509), the CPU 154 advances the processing to step S511.

In step S510, the CPU 154 determines whether the elapsed time of the operation in the DPP mode has exceeded a time-out period. If the result of determination in step S510 is no (NO in step S510), the CPU 154 returns the processing to step S509, thus waiting for a setup request using the DPP, and, if the result of determination in step S510 is yes (YES in step S510), the CPU 154 advances the processing to step S514.

In step S511, the CPU 154 performs network setup using the DPP.

Furthermore, in the present processing, processing which the CPU 154 performs is processing which has been described as processing which the communication apparatus 151 performs after receiving a setup request using the DPP from the information processing apparatus 101, in step S201 to step S204 illustrated in FIG. 2. After that, the CPU 154 advances the processing to step S512.

In step S512, the CPU 154 determines whether network setup using the DPP is successful. Furthermore, for example, in a case where the public key included in the WEC-related information received from the information processing apparatus 101 in step S511 is not the latest public key generated in step S502, network setup using the DPP is failed, so that the communication apparatus 151 does not connect to any access point. Furthermore, the present determination can be a determination as to whether a connection to an access point corresponding to information received from the information processing apparatus 101 is successful. If the result of determination in step S512 is no (NO in step S512), the CPU 154 advances the processing to step S513, and, if the result of determination in step S512 is yes (YES in step S512), the CPU 154 advances the processing to step S514.

In step S513, the CPU 154 displays a second error notification screen indicating that network setup using the DPP is failed. Furthermore, the second error notification screen can be, for example, a screen for advising the user to perform network setup by the network setup mode. After that, the CPU 154 advances the processing to step S514.

In step S514, the CPU 154 ends an operation in the DPP mode of the communication apparatus 151.

Thus, the CPU 154 stops awaiting of a setup request using the DPP.

In step S515, the CPU 154 disables (deletes) the WEC-related information generated in step S503.

In this way, in the present exemplary embodiment, the DPP mode is started at timing close to timing at which outputting of a QR Code® is performed. With this configuration, at timing in which there is a high possibility of the user issuing an instruction for network setup using the DPP, the communication apparatus 151 is able to start an operation in the DPP mode. As a result, network setup using the DPP is swiftly performed, so that usability in network setup using the DPP is improved.

While, in the above-described exemplary embodiment, connection information about the connected AP is transmitted by WEC and, in various determinations such as those in step S411 to step S413, each determination is performed with respect to the connected AP, the above-described exemplary embodiment is not limited to this configuration. Information about an AP different from the connected AP can be transmitted, and each determination can be performed with respect to an AP different from the connected AP. Specifically, the AP different from the connected AP can be, for example, an access point to which the information processing apparatus 101 has not been connecting when the setting operation has been performed but to which the information processing apparatus 101 has ever connected at any timing before the setting operation is performed. Moreover, the AP different from the connected AP can be an access point selected by the user from a list of access points to which the information processing apparatus 101 has ever connected. This is because connection information about an access point to which the information processing apparatus 101 has ever connected at any timing is able to be transmitted by WEC as long as the connection information is stored by the OS.

While, in network setup in step S424, a configuration in which connection information is transmitted via a connection between the information processing apparatus 101 and the communication apparatus 151 by Wi-Fi® has been described, the above-described exemplary embodiment is not limited to this configuration. For example, in network setup, connection information can be transmitted via a connection between the information processing apparatus 101 and the communication apparatus 151 by a communication method other than Wi-Fi®, such as Bluetooth® Low Energy. Furthermore, in the case of this configuration, the information processing apparatus 101 is able to connect to the communication apparatus 151 by Bluetooth® Low Energy while maintaining a Wi-Fi® connection with the connected AP. Thus, the information processing apparatus 101 is able to transmit connection information about an access point to which the information processing apparatus 101 is currently connecting, as connection information about the connected AP. Furthermore, even in this configuration, a communication protocol different from the DPP is assumed to be used.

In the above-described exemplary embodiment, a configuration in which, in step S407, various pieces of information are acquired via a Wi-Fi® connection between an access point which is enabled by the communication apparatus 151 operating in the network setup mode and the information processing apparatus 101 has been described. However, the above-described exemplary embodiment is not limited to this configuration. Various pieces of information can be acquired by reading of a QR Code® such as that in step S420 or can be acquired via a communication by another communication method, such as NFC or BLE.

The above-described exemplary embodiment can be implemented by performing the following processing. Thus, the processing supplies software (program) for implementing the functions of the above-described exemplary embodiment to a system or apparatus and causes a computer (a CPU or a micro processing unit (MPU)) of the system or apparatus to read out and execute the program. Moreover, the program can be configured to be executed by a single computer or can be executed by a plurality of computers operating in conjunction with each other. Moreover, not all of the above-described processing operations do not need to be implemented by software, and a part or all of the above-described processing operations can be implemented by hardware such as an application specific integrated circuit (ASIC). Moreover, the CPU is not limited to a single CPU which performs all of the processing operations but can include a plurality of CPUs which performs processing while cooperating with each other as appropriate.

While, in the above-described exemplary embodiment, network setup is performed by the DPP, the above-described exemplary embodiment is not limited to this configuration. For example, instead of the DPP, HyperText Transfer Protocol (HTTP) can be used. Moreover, the communication apparatus 151 can operate in, instead of the DPP mode, a mode for performing network setup by a protocol different from the DPP. Thus, a configuration in which network setup is performed by a function different from WEC as long as it is a function which performs network setup based on information acquired by reading of a QR Code® can be employed.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random access memory (RAM), a read-only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-140198 filed Aug. 30, 2021, which is hereby incorporated by reference herein in its entirety.

What is claimed is:

1. A communication apparatus capable of communicating with an information processing apparatus, the communication apparatus comprising:
 a reception unit configured to receive a predetermined instruction;
 an output unit configured to output a predetermined two-dimensional code based on the received predetermined instruction;
 a control unit configured to, based on the received predetermined instruction, cause the communication apparatus to start an operation in a predetermined mode for receiving predetermined information for connecting to an external access point that is external to the information processing apparatus and the communication apparatus from the information processing apparatus having read the predetermined two-dimensional code; and
 a connection unit configured to, in a case that the predetermined information is received from the information processing apparatus having read the predetermined two-dimensional code, connect the external access point and the communication apparatus to each other based on the predetermined information,
 wherein the predetermined mode is a mode for receiving the predetermined information by a predetermined protocol from the information processing apparatus having read the predetermined two-dimensional code,
 wherein the communication apparatus is capable of operating in a specific mode, different from the predetermined mode, for receiving information for connecting to the external access point from the information processing apparatus by a specific protocol different from the predetermined protocol, and
 wherein the specific protocol is Simple Network Management Protocol (SNMP).

2. The communication apparatus according to claim 1, wherein the predetermined protocol is Device Provisioning Protocol (DPP).

3. The communication apparatus according to claim 1, wherein the predetermined two-dimensional code is a QR code.

4. The communication apparatus according to claim 3, wherein the operation in the predetermined mode is started after the QR code is output.

5. The communication apparatus according to claim 1, further comprising:
 a receiving unit configured to receive a print job via a connection between the external access point and the communication apparatus; and
 a printing unit configured to perform printing based on the received print job.

6. The communication apparatus according to claim 1, wherein the predetermined two-dimensional code is information for causing the information processing apparatus having read the predetermined two-dimensional code to acquire specific information.

7. The communication apparatus according to claim 6, wherein the predetermined information is information encrypted based on the specific information.

8. The communication apparatus according to claim 6, further comprising a transmission unit configured to, in a case where a predetermined connection between the communication apparatus operating the a specific mode and the information processing apparatus is established, transmit the specific information via the predetermined connection.

9. The communication apparatus according to claim 1, wherein a communication by the predetermined protocol and a communication by the specific protocol are performed by a communication standard compliant with IEEE 802.11 series.

10. The communication apparatus according to claim 1, wherein a time-out period in the predetermined mode and a time-out period in the specific mode are equal to each other.

11. The communication apparatus according to claim 1, wherein a time-out period in the predetermined mode and a time-out period in the specific mode are different from each other.

12. A communication apparatus capable of communicating with an information processing apparatus, the communication apparatus comprising:
 a reception unit configured to receive a predetermined instruction;
 an output unit configured to output a predetermined two-dimensional code based on the received predetermined instruction;
 a control unit configured to, based on the received predetermined instruction, cause the communication apparatus to start an operation in a predetermined mode for receiving predetermined information for connecting to an external access point that is external to the information processing apparatus and the communication apparatus from the information processing apparatus having read the predetermined two-dimensional code; and
 a connection unit configured to, in a case that the predetermined information is received from the information processing apparatus having read the predetermined two-dimensional code, connect the external access point and the communication apparatus to each other based on the predetermined information,
 wherein the predetermined two-dimensional code is information for causing the information processing apparatus having read the predetermined two-dimensional code to acquire specific information,
 wherein the communication apparatus further comprises a transmission unit configured to, in a case where a predetermined connection between the communication apparatus operating in a specific mode and the information processing apparatus is established, transmit the specific information via the predetermined connection,
 wherein the predetermined mode is a mode for receiving the predetermined information by a predetermined protocol from the information processing apparatus having read the predetermined two-dimensional code, and
 wherein the specific mode, different from the predetermined mode, is a mode for receiving information for connecting to the external access point from the information processing apparatus by a specific protocol different from the predetermined protocol.

13. The communication apparatus according to claim 12, wherein the predetermined protocol is Device Provisioning Protocol (DPP).

14. The communication apparatus according to claim 12, further comprising:
- a receiving unit configured to receive a print job via a connection between the external access point and the communication apparatus; and
- a printing unit configured to perform printing based on the received print job.

15. A communication apparatus capable of communicating with an information processing apparatus, the communication apparatus comprising:
- a reception unit configured to receive a predetermined instruction;
- an output unit configured to output a predetermined two-dimensional code based on the received predetermined instruction;
- a control unit configured to, based on the received predetermined instruction, cause the communication apparatus to start an operation in a predetermined mode for receiving predetermined information for connecting to an external access point that is external to the information processing apparatus and the communication apparatus from the information processing apparatus having read the predetermined two-dimensional code; and
- a connection unit configured to, in a case that the predetermined information is received from the information processing apparatus having read the predetermined two-dimensional code, connect the external access point and the communication apparatus to each other based on the predetermined information,
- wherein the predetermined mode is a mode for receiving the predetermined information by a predetermined protocol from the information processing apparatus having read the predetermined two-dimensional code,
- wherein the communication apparatus is capable of operating in a specific mode, different from the predetermined mode, for receiving information for connecting to the external access point from the information processing apparatus by a specific protocol different from the predetermined protocol, and
- wherein a time-out period in the predetermined mode and a time-out period in the specific mode are equal to each other or different from each other.

16. The communication apparatus according to claim 15, wherein the predetermined protocol is Device Provisioning Protocol (DPP).

17. The communication apparatus according to claim 15, further comprising:
- a receiving unit configured to receive a print job via a connection between the external access point and the communication apparatus; and
- a printing unit configured to perform printing based on the received print job.

* * * * *